(12) United States Patent
Delph

(10) Patent No.: US 6,199,104 B1
(45) Date of Patent: *Mar. 6, 2001

(54) SERVER-BASED HOST MONITOR

(75) Inventor: Daniel C. Delph, Euless, TX (US)

(73) Assignee: Sabre Inc., Fort Worth, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,237

(22) Filed: Apr. 28, 1997

(51) Int. Cl.$^7$ .................................................. G06F 15/16
(52) U.S. Cl. ........................... 709/208; 709/224; 709/246
(58) Field of Search ........................ 395/200.76; 709/204, 709/205, 208, 209, 210, 211, 246, 226

(56) References Cited

U.S. PATENT DOCUMENTS

| | | | |
|---|---|---|---|
| 4,722,005 | 1/1988 | Lendenbach | 358/168 |
| 4,974,173 | 11/1990 | Stefik et al. | 364/521 |
| 5,101,402 | 3/1992 | Chiu et al. | 370/17 |
| 5,117,225 | 5/1992 | Wang | 340/717 |
| 5,191,523 | 3/1993 | Whitesage | 705/6 |
| 5,220,655 | 6/1993 | Tsutsui | 395/325 |
| 5,237,499 | 8/1993 | Garback | 705/5 |
| 5,241,625 | 8/1993 | Epard et al. | 395/163 |
| 5,311,425 | 5/1994 | Inada | 705/6 |
| 5,392,400 | 2/1995 | Berkowitz et al. | 395/200 |
| 5,440,699 | 8/1995 | Farrand et al. | 395/155 |
| 5,467,268 | 11/1995 | Sisley et al. | 705/9 |
| 5,469,183 | 11/1995 | Takatsuji et al. | 345/2 |
| 5,500,929 | 3/1996 | Dickinson | 395/160 |
| 5,504,675 | 4/1996 | Cragun et al. | 364/401 |
| 5,508,713 | 4/1996 | Okouchi | 345/1 |
| 5,530,852 | 6/1996 | Meske, Jr. et al. | 395/600 |
| 5,544,354 | 8/1996 | May et al.. | 395/600 |
| 5,553,239 | 9/1996 | Health et al. | 395/108.01 |
| 5,553,281 | 9/1996 | Brown et al. | 395/600 |
| 5,563,805 | 10/1996 | Arbuckle et al. | 364/514 |
| 5,570,283 | 10/1996 | Shoolery et al. | 705/5 |
| 5,572,643 | 11/1996 | Judson | 3995/793 |
| 5,577,254 | 11/1996 | Gilbert | 3995/615 |
| 5,577,258 | 11/1996 | Cruz et al. . | |

(List continued on next page.)

FOREIGN PATENT DOCUMENTS 0 720 412   7/1996   (EP) .
0 753 836   1/1997   (EP) .

OTHER PUBLICATIONS

Sinha, Pradeep K., "Distributed Operating Systems—Concepts and Design," IEEE Press, pp. 1–16, 1997.

* "Protect Your Company From a Net Loss of Productivity" (undated).

* Yeh, Ping–Jer et al., "Synchronous Navigation Control for Distance Learning on the Web", Computer Networks and ISDN Systems 28 (1996) pp. 1207–1218.

* Jacobs, Stephan et al., Filling HTML Forms Simultaneously: CoWeb—Architecture and Functionality, Computer Networks and ISDN Systems 28 (1996) pp. 1385–1395.

(List continued on next page.)

Primary Examiner—Dung C. Dinh
(74) Attorney, Agent, or Firm—Finnegan, Henderson, Farabow, Garrett & Dunner, L.L.P.

(57) ABSTRACT

A server-based host monitor is provided that allows a host computer to send host data to an intermediate server interfaced with a network. The intermediate server includes a conversion program that translates the host data into a format common with the network. The translated host data is made accessible to a computer interfaced with the network. The receiver computer may receive and view the translated host data in either a synchronous or asynchronous mode.

24 Claims, 2 Drawing Sheets

U.S. PATENT DOCUMENTS

| | | | |
|---|---|---|---|
| 5,608,874 | * | 3/1997 | Ogawa et al. .................. 707/201 |
| 5,696,898 | | 12/1997 | Baker et al. . |
| 5,706,507 | | 1/1998 | Schloss . |
| 5,717,860 | | 2/1998 | Graber et al. . |
| 5,724,355 | | 3/1998 | Bruno et al. . |
| 5,727,159 | | 3/1998 | Kikinis . |
| 5,734,719 | | 3/1998 | Tsevdos et al. . |
| 5,742,762 | | 4/1998 | Scholl et al. . |
| 5,752,022 | | 5/1998 | Chiu et al. . |
| 5,754,830 | | 5/1998 | Butts et al. . |
| 5,761,071 | | 6/1998 | Bernstein et al. . |
| 5,761,683 | | 6/1998 | Logan et al. . |
| 5,774,660 | | 6/1998 | Brendel et al. . |
| 5,781,909 | | 7/1998 | Logan et al. . |
| 5,832,454 | | 11/1998 | Jafri et al. ...................... 705/6 |
| 5,944,791 | | 8/1999 | Scherpbier ...................... 709/218 |

OTHER PUBLICATIONS

* Frivold, Thane J. et al., "Extending WWW for Synchronous Collaboration", Computer Networks and ISDN Systems 28 (1995) pp. 69–75.

* Byford, D., "Changeable Advertising Display", IBM Technical Disclosure Bulletin, vol. 40, No. 2, Feb. 1997.

* Hauck, Franz J., "Supporting Hierarchical Guided Tours in the World Wide Web", Computer Network and ISDN Systems 28 (1996) pp. 1233–1242.

"Protect Your Company From a Net Loss of Productivity," (undated).

"Ubiquitous Advertising on the WWW: Merging Advertisement on the Browser", Computer Networks and ISDN Systems, vol. 28, No. 11, May 1996, pp. 1493–1499.

"Mainframes as High Volume TP Servers for the Web", D.A. Williamson, 1997 IEEE Aerospace Conference. Proceedings (Cat. No. 97CH36020), 1997 IEEE Aerospace Conference, Snowmass at Aspen, Co., Feb. 1–8, 1997, vol. 4, pp. 129–137.

"How to Put Mainframes on the Web", BYTE, Jun. 1996, McGraw–Hill, USA, vol. 21, No. 6, pp. 53–54.

"Lasting Legacy: Browsing Big Iron on the Web", Lee Bruno, Data Communications on the Web, Nov. 1996, pp. 1–8.

* cited by examiner

FIG. 2

SERVER-BASED HOST MONITOR

RELATED PATENT APPLICATIONS

This application is related to U.S. patent application Ser. No. 08/840,665 (pending) entitled "Server-Based Kiosk Controller," filed on Apr. 28, 1997, which is incorporated herein by reference as if fully set forth, and to U.S. patent application Ser. No. 08/840,329 (pending) entitled "Server-Based Browser Monitor," filed on Apr. 28, 1997, which is incorporated herein by reference as if fully set forth.

TECHNICAL FIELD OF THE INVENTION

The present invention relates generally to computer networks, and more particularly, to an apparatus and method for monitoring information being reviewed by a host computer.

BACKGROUND OF THE INVENTION

In recent years, computer networks have grown very popular with computer users as a means of communicating and exchanging information. Such networks allow personal computer users to connect with each other, either directly or through a central communication point, and to exchange information by using a protocol common to each personal computer in each network. Corporations and businesses now commonly network computers used by their employees in "intranets" which are networks that have limited access to certain persons and/or computers. Such intranets are often protected by elaborate security systems or "firewalls" which prevent unauthorized users from accessing the intranet. By contrast, the term "Internet" has been adopted to describe the publicly available network to which virtually every personal computer in the world has access. Recent improvements in the software available for accessing and searching the Internet have made the Internet a very popular source of information which can even be utilized by novices to computer technology.

Computers communicate on intranet and internet networks by the use of a common set of standards for exchanging data known as the Transmission Control Protocol/Internet Protocol ("TCP/IP"). To initiate communication on such a network, a user, known as a "client" contacts another computer on the network, known as the "server" or "host," by using various publicly available software programs. In public networks such as the Internet, these programs use various protocols to organize information in a manner which allows the user to locate and access files of interest to the user. For instance, some files are organized by a hierarchical menu system known as the "gopher." A user can search the Internet by linking from an Internet site of interest, or by entering the uniform resource locator ("URL") of the file on the gopher which the user wants to review.

The most popular and user-friendly protocol for organizing information on the Internet has become the World Wide Web (the "WWW" or "Web"). The Web links information by associating items of interest through a common scripting language known as the Hyper Text Markup Language ("HTML"), and transmits these HTML-based files between servers and clients using a common protocol known as the Hyper Text Transfer Protocol ("HTTP"). A Web user searches the Web by starting at the user's "home page," which is created and operated HTML. From the home page, the Web user searches out and retrieves information by using "web browser" software. Web browsers allow a Web user to retrieve and render images and texts from files of interest to the user's computer. Web browsers operate by allowing a Web user to identify a "Web link" of interest on a Web page and then execute the Web link to transfer the computer data associated with the Web link from the host computer containing that data to the Web user's computer. Web links perform this transfer of computer data by communicating the URL of the desired file to the host.

The increased usage of the Internet has generated considerable interest in commercial applications of the Internet. As is disclosed in U.S. Pat. No. 5,553,239 by Health et al., on-line services have made the Internet easily accessible to computer novices through the use of central servers. For a slight fee, these on-line services provide an access to the Internet, with a central server acting as a point of entry and as an intermediary between the Internet user and the Internet sites selected by the user. The increased number of persons accessing the Internet through such on-line services and otherwise has created a tremendous opportunity for businesses to market goods and services to a large captive audience.

Businesses have responded to the available market of Internet users by creating a large number of Web pages which users can review. However, a number of businesses have developed extensive computer systems for marketing goods and services which do not use formats and protocols that can be readily sent over the Internet. Thus, the business might create a web page for Internet users to view but might not be able to efficiently translate data from existing formats into formats which Internet users can review.

Accordingly, both Internet users and businesses would benefit from a system or method which allows Internet users to access and review information stored in the computer systems used by businesses, regardless of the format used to store and recover the business information. However, such a system would have to overcome the difficulty presented by the wide array of hardware and software systems with which users access the Internet. Further, when a user accesses the Internet from an intranet, or when a firewall protects a corporate system in an intranet, the difficulty of accessing and presenting business information is compounded.

Existing systems such as Carbon Copy, PC Anywhere, Outreach and the systems disclosed in U.S. Pat. No. 5,241,625 by Epard, et al. and U.S. Pat. No. 5,577,254 by Gilbert do allow a client computer to receive and render the same monitor screen. data as is rendered by a host computer, but such systems require compatibility between the client and host computers with respect to the hardware and/or software used by the client and the host computers. Thus, in order to use these existing systems, the client and host have to first exchange hardware and/or software and have to know each other's network address, known as an IP address. In addition to these complications, these existing systems require considerable processing by each computer and are thus slow in use. Further, these systems require protocols that are not commonly used on public networks such as the Internet. Thus, corporate intranets that might allow access to the Internet through Gopher and HTTP protocols may not allow an unrecognized system-specific protocols of these existing systems to pass through their firewalls.

SUMMARY OF THE INVENTION

Therefore, a need has arisen for a host monitor which allows a user of a network to receive and review host data from a host computer, such as the screen data displayed on the monitor screen of the host computer.

The present invention provides an apparatus and method for providing data from a host computer to a receiver computer through an intermediate server interfaced with a common network such as the Internet.

More specifically, the present invention allows an intermediate server to receive data from a host computer, translate the data with a conversion program into a format common to a network, and then send the translated data through the network to a receiver computer, or a plurality of receiver computers. A local storage device associated with the intermediate server can playback stored data to receiver computers. Further, the conversion program can direct the intermediate server to retrieve data from content servers interfaced with the network and irterrelate this content data with the host data according to key phrases in each set of data. When the network is the Internet, the intermediate server can translate host. data into the World Wide Web protocol.

The present invention provides an important technical advantage by allowing a receiver computer to receive and use data of a host computer even if the receiver computer and host computer do not share a common protocol. This allows a user of a host computer to push information from his screen to the screen of a geographically distant network user, thereby providing the host user and network user with a common reference for commercial or other discussions. By using the standard protocol of a network, the intermediate server allows the transfer of host data without requiring any special software or hardware for the receiver computer. In particular, by using the HTTP protocol of the Web, the intermediate server allows the transfer of host data to any computer capable of accessing the Web.

The present invention provides a number of technical advantages. The intermediate server's use of a common network protocol allows the transfer of data without the receiver computer having specific software other than the software needed to access the network. The reduced software requirement of the present invention reduces the computing power needed to provide data to a receiver computer and increases the speed of the transfer. Further, otherwise incompatible hardware systems can easily transfer data. Even further, data transfers can take place without the sender or receiver computer knowing each other's IP address.

BRIEF DESCRIPTION OF THE DRAWINGS

A more complete understanding of the present invention and the advantages thereof may be acquired by referring to the following description taken in conjunction wish the accompanying drawings in which like referenced numbers indicate like features, and wherein.

DETAILED DESCRIPTION OF THE INVENTION

Preferred embodiments of the present invention are illustrated in the figures, like numerals being used to refer to like and corresponding parts of the various drawings.

The present invention uses the common protocol of a network to allow a receiver computer to receive data from a host computer, even if the host computer data is incompatible with the receiver computer. The host computer sends its host data to an intermediate server through an interface such as a network. A network is any means of transmitting data between computers and generally entails the use of a common protocol. The intermediate server has a conversion program which directs the intermediate server to receive the host data and translates the host data to a protocol which is compatible with the receiver computer. The translated host data is then available for the receiver computer to request and receive from the intermediate server. When the host data comprises screen data, meaning data used in order for the host computer to render a particular screen display, then the intermediate server can translate the host data into a form which will allow the receiver computer to render a screen display identical to the display of the host computer, or a screen display modified to have a more user-friendly format than the screen display of the host computer.

Figure 1:
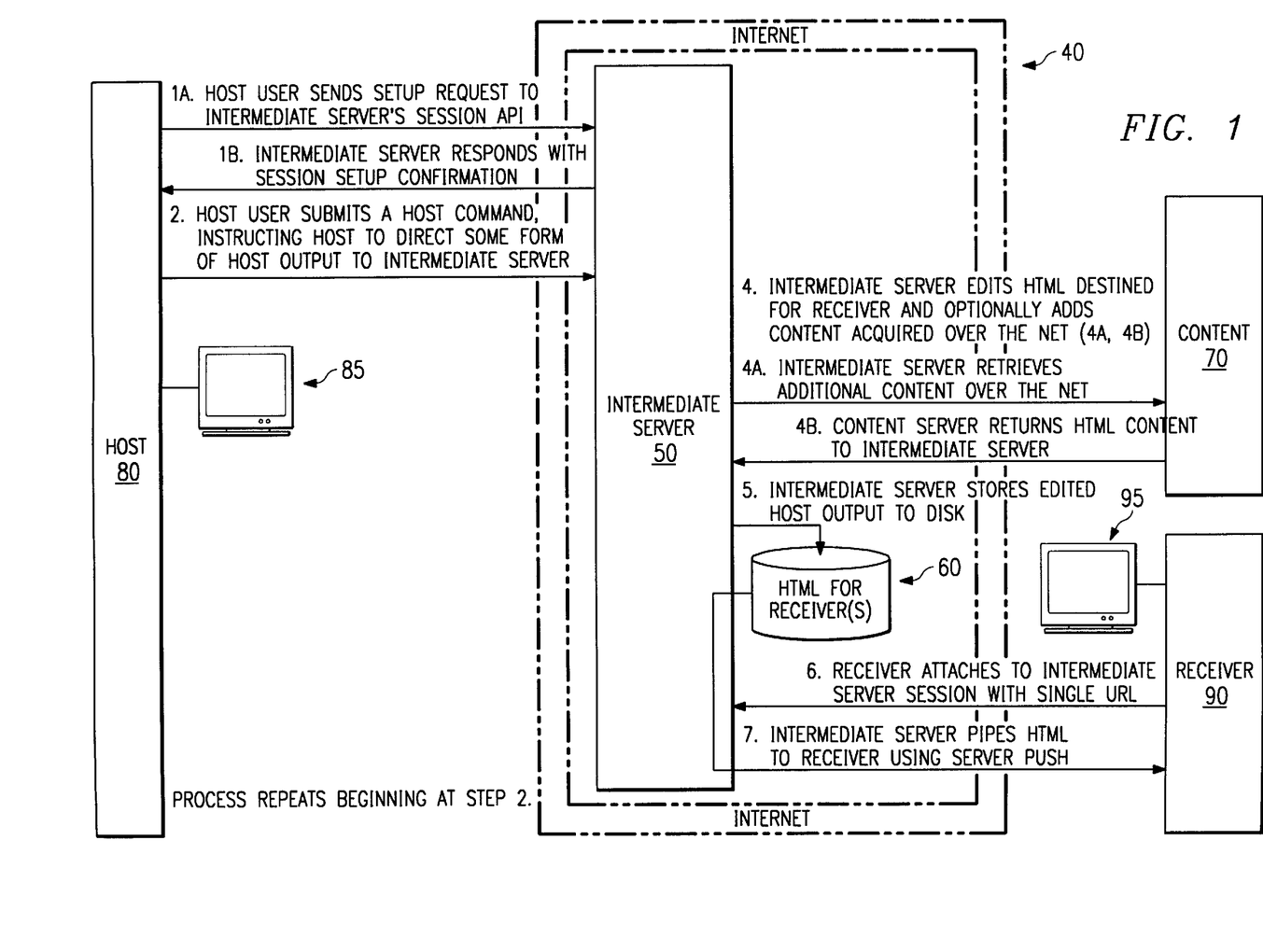
FIG. 1 shows a block diagram of the preferred embodiment.

FIG. 1 depicts a preferred embodiment of the present invention interfacing with Internet 40 by using a World Wide Web protocol. The term "Internet" as used herein refers to any network to which the public has access. Generally, a computer user can interface with the Internet through any telephone line or equivalent means of communication if the user's computer can implement TCP\IP or any other compatible protocol. The term "network" as used herein means any means of transmitting data between computers and generally entails the use of a common protocol.

Intermediate server 50 interfaces with the Internet 40. Typically, servers that interface with a network have a processor to operate the interface to the network and at least one local storage device. The interface itself is typically through a modem, although other means are available, such as ISDN or the high speed trunk lines which form part of the Internet. In the preferred embodiment, the intermediate server has a processor with at least the capability of an Intel 386 processor, which is the minimum capability generally required to efficiently run the Web's HTTP protocol. The intermediate server interfaces with the network through a modem, although any interface having the ability to receive input from at least two clients will suffice. The memory of the preferred embodiment includes local RAM memory adequate to operate the HTTP protocol and a local storage device (60) such as a disk storage device having enough memory to store at least one Web page, although an equal amount of RAM or other memory will also work. Any single or plurality of storage devices having adequate size may serve as the storage device for intermediate server 50.

A host computer 80 is interfaced with intermediate server 50. This interface can occur by a direct connection between host computer 80 and intermediate computer 50 or can be established by interfacing host computer 80 with the Internet 40. Host computer 80 includes a memory to store host data, such as screen data that allows host computer 80 to display information on a host computer monitor screen 85. Any computer which can hold data and transmit that data can act as a host computer. Even a 3270 IBM terminal, also known as an icon terminal, can act as a host computer for the present invention. For instance, an operator of a 3270 terminal could transmit information by hitting a print screen button with the screen data directed to intermediate server 50 through either a direct connection or through Internet 40.

Receiver computer 90 is interfaced with Internet 40 thereby giving it access to intermediate server 50. Receiver computer 90 preferably includes at least one network interface such as a modem and the ability to use a protocol common to the protocol used by the intermediate server. In the preferred embodiment, receiver computer 90 has a processor with at least the capability of an Intel 386 processor which is the minimum capability generally required to run the Web's HTTP protocol and efficiently render a Web page in an HTML format upon a computer monitor screen.

Receiver computer 90 has a computer monitor screen 95 which renders computer data received from intermediate server 50.

Steps 1–7 depicted in FIG. 1 illustrate the operation of the intermediate server as an apparatus for sharing data between a host computer (80) and a receiver computer 90. In Step 1*a* host computer 80 sends a set-up request to intermediate server 50. In response, a session application program interface associated with an identification program loaded in the memory of intermediate server 50 directs it to send a session set-up confirmation output and establish a named communication session with host computer 80. At Step 2, upon establishing an interface between host computer 80 and intermediate server 50, the host computer 80 submits host data to intermediate server 50. Using the above example, the user of a host computer 80 submits a command or query to the host computer from a host terminal and directs the host computer to simultaneously direct the output to both the host computer monitor screen 85 and to the intermediate server 50 through Internet 40. The host computer does not require a Web browser to send host data to the intermediate server 50.

At Step 4, a conversion program loaded in intermediate server 50 directs intermediate server 50 to modify the host data into a format conventionally accepted by the Internet. For instance, intermediate server 50 has the layout of the print output from host computer 80 and rearranges that data into HTML format. Thus, the output duplicates the screen displayed by host monitor screen 85 or, in an alternate embodiment, edits the host data into a more user-friendly display.

As an example of how this portion of the process may occur, consider the instance of a travel computer application wherein intermediate server 50 searches the host data for identifiable key phrases. One such phrase may be, for example, ORD to retrieve a stored user-friendly phrase such as "Chicago O'Hare" related to recognized key host phrases. The conversion program then directs intermediate server 50 to display the phrase "Chicago O'Hare" where ORD had previously been displayed. Alternatively, graphical text such as a picture of the "Windy City" could be displayed.

In one alternative embodiment, content server 70, or even a plurality of content servers, interfaces with Internet 40. Content server 70 includes content data such as destination information which augments or improves the host data. At step 4*a*, intermediate server 50 retrieves content data corresponding to key phrases identified in the host data, such as HTML pages on the "Windy City." For instance, intermediate server 50 may retrieve data from a Web site with information about Chicago, thereby providing travel information relating to potential lodging or dining destinations near Chicago O'Hare airport The conversion program may then interrelate the relevant content data to the host data by inserting the content data or by inserting Web links to the content data in the translated host data, thereby allowing a Web browser to retrieve the content data to the receiver computer 90. The conversion program may also modify these Web links into modified Web links that point back to intermediate server 50. The conversion program creates modified Web links by appending the original Web links to the location name of the intermediate server. This permits directing the browser of receiver computer to retrieve content data through the intermediate server.

At step 5, intermediate server 50 stores translated host data into the local storage device 60. At step 6, receiver computer 90 contacts intermediate server 50 through Internet 40 using a single URL and provides intermediate server 50 with session certification information in this URL to retrieve the translated host data saved in local storage device 60. On receiving a request for this information, intermediate server 50 sends the translated host data to receiver computer 90 using a server push technique such as HTTP MIME Type Multi-Part\X-Mixed-Replace. Using a server push technique allows a Web browser on receiver computer 90 to continuously receive data in the Web's HTTP protocol without having to repeat step 6 to reattach to the intermediate server 50. In this way receiver computer 90 may view a continuous series of pages of translated host data using a Web browser at the same time that host monitor 85 views the same host data in what is referred to as a "synchronous mode." Alternatively, a playback program loaded on intermediate server 50 will allow a receiver computer 90 to retrieve this stored information 60 at a future time.

Figure 2:
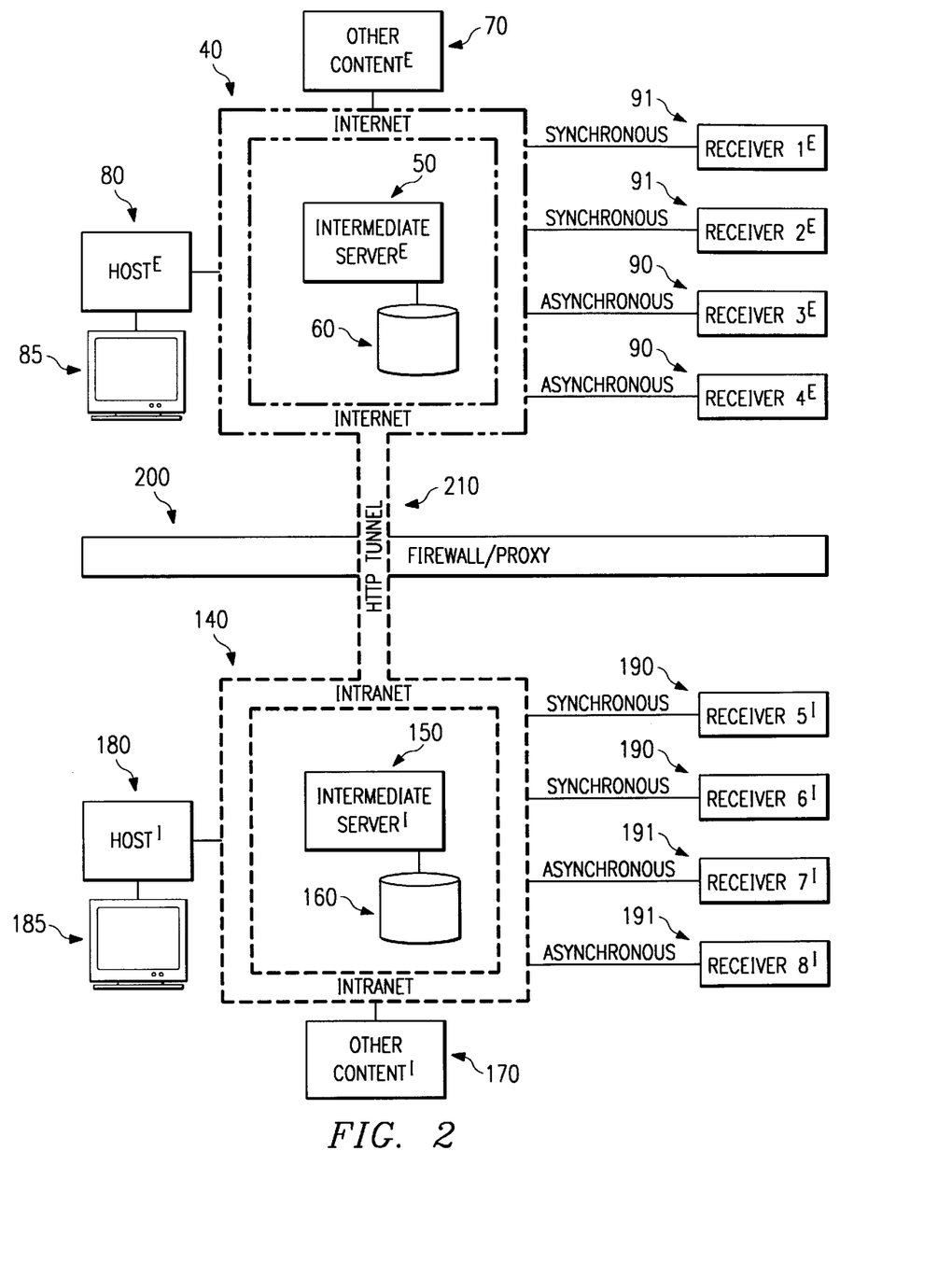
FIG. 2 shows the preferred embodiment used as a tunnel across a corporate firewall.

FIG. 2 illustrates several embodiments of the present invention. Intermediate server 150 interfaces to intranet 140. Host computer 180 interfaces with intermediate server 150 through intranet 140. Intranet 140 provides intermediate server 150 with access to a plurality of additional content servers 170. A plurality of receiver computers 190 interface with intermediate server 150 through intranet 140 allowing receiver computers 190 to view the screen data of host computer 180 in a synchronous mode, as described above. A plurality of receiver computers 191 interface with intermediate server 150 through intranet 140 allowing them to view host data in an asynchronous mode, meaning that viewing may occur after the host computer stops viewing the data and stores the data on a storage device 160 associated with intermediate server 150.

FIG. 2 illustrates intermediate server 50 interfacing on one sided of a firewall 200 through the Internet 40 with content server 70 as well as a plurality of receiver computers 91 and receiver computers 90. Receiver computers 90, for example, share data in an asynchronous mode, whereas receiver computers 91 receive data in a synchronous mode. Firewall 200 protects intranet 140 from unauthorized access by computers or users outside of the firewall. Firewall 200 maintains security by preventing outside computers or users from accessing resources and data on intranet 140. Thus, for instance, receiver computers 90 and 91 could not use intermediate server 150 to view host monitor screen data from host computer 180. However, receiver computers 90 and 91 could view data from host computer 180 if that data is first sent to intermediate server 150 and then pushed to intermediate server 50 through an HTTP tunnel 210.

In operation, the present invention allows a consumer to contact a salesperson and view host information transmitted by the salesperson through a computer network even if the salesperson does not have a system compatible with the network. For instance, a traveler could call a travel agent having access to an automated reservations system. The travel agent may call up travel information for destinations available through the automated reservation system, but cannot transfer this destination information through the Internet directly to the consumer's Web browser. The travel agent may, however, provide the traveler with Internet identification information such as a domain name or URL of an intermediate server, which allows the traveler to contact the intermediate server through the Internet using the protocol of the Web. The travel agent may then send host data to the intermediate server, which translates that data into Web format. If the traveler's destination is one which has additional Web sites associated with. it, then the conversion program of the intermediate server may identify these Web sites and provide them to the traveller. Once the traveller retrieves the HTML page produced by the translated host data, he may print this page out and retrieve information such as his reservation number which will allow him to travel without actually ever receiving a ticket. The travel agent accomplishes this transfer of data without requiring the traveller to have compatible software programs other than a simple Web browser. The data is transferred without the delay normally associated with existing systems, allowing the travel agent to discuss the data with the traveller in real time.

The present invention has a number of practical applications. For instance, a bank teller may provide account information to a customer while simultaneously sending that data to the customer for the customer to view himself. A broker could send stock information to a client which includes links to the home pages of the displayed stocks. The customer may review company data while discussing stock purchases. Any customer with access to the Internet may now literally see what a sales person is talking about. Further, the same information can be provided by a host operator and saved by the intermediate server in the asynchronous mode. Thus, the teller or broker could download information and notify the customer about the location of the information, for instance through e-mail, so that the customer view the information at a later and more convenient time.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An apparatus for sharing data between a host computer and a receiver computer through a network, the apparatus comprising:
    a host computer interfaced with the network, the host computer including host data;
    a receiver computer interfaced with the network;
    an intermediate server interfaced with the network, said intermediate server comprising a session application program interface that establishes a communication session with said host computer in response to a set-up request received from said host computer; and
    a conversion program loaded on said intermediate server, said conversion program operationally directing said intermediate server to:
        receive the host data from said host computer through the network after the communication session has been established between said host computer and said intermediate server;
        translate the host data; and
        send the translated host data to said receiver computer, wherein the host data comprises screen data representing data displayed to a user on a monitor screen connected to the host computer, and said conversion program directs said intermediate server to translate the screen data to an HTML format.

2. The apparatus according to claim 1 further comprising a local storage device operationally coupled to said intermediate server; and
    wherein said translation program directs said intermediate server to store the translated data on said local storage device.

3. The apparatus according to claim 2 further comprising a playback program loaded on said intermediate server, said playback program directing said intermediate server to:
    retrieve translated host data stored on said local storage device; and
    send the translated host data to said receiver computer.

4. The apparatus according to claim 1 further comprising a plurality of receiver computers interfaced with said network; and
    wherein said conversion program directs said intermediate server to send the translated host data to each receiver computer.

5. The apparatus according to claim 3 further comprising a plurality of receiver computers interfaced with said network; and
    wherein said conversion program directs said intermediate server to send the translated host data to each receiver computer.

6. The apparatus according to claim 1, wherein the host computer simultaneously directs the screen data to the monitor screen and to said intermediate server through the network in response to a command entered by the host computer user.

7. The apparatus according to claim 1 wherein the network is the Internet.

8. The apparatus of claim 7 wherein said conversion program directs said intermediate server to:
    search the screen data to identify a key phrase; and
    translate the key phrase to a user-friendly phrase.

9. The apparatus according to claim 8 further comprising a content server interfaced with the Internet, said content server having content data; and
    wherein said conversion program directs said intermediate server to embed the content data into the screen data.

10. The apparatus according to claim 8 further comprising a content server interfaced with the Internet, said content server having content data; and
    wherein said conversion program directs said intermediate server to:
        create a web link identifying said content server; and
        insert the web link in the screen data.

11. An apparatus for sharing data between a host computer and a receiver computer through a network, the apparatus comprising:
    an intermediate server interfaced with the network;
    a host computer adapted to operationally interface with said intermediate server, said host computer including host data; and
    a receiver computer interfaced with the network;
    said intermediate server comprising a session application program interface that establishes a communication session with said host computer in response to a request received from said host computer, and
    a conversion program loaded on said intermediate server, said conversion program directing said intermediate server to:
        receive the host data submitted from said host computer; and
        translate the host data into translated host data,
        wherein said apparatus further comprises a content server including content data and said network comprises the Internet, and
        further wherein said conversion program operationally directs said intermediate server to retrieve the content data from said content server, search the host data for key host phrases, search the content data for key content phrases, and interrelate the key host phrases with the key content phrases, said intermediate server, content server and receiver computer are interfaced with the Internet using the World Wide Web protocol, and said conversion program translates the host data into HTML data.

12. The apparatus according to claim 11 further comprising a local storage device operationally interfaced with said intermediate server; and a playback program loaded on said intermediate server operationally directing said intermediate server to:
store the translated host data on said local storage device; and
send the translated host data to said receiver computer in an asynchronous mode.

13. The apparatus according to claim 11, wherein the host data comprises screen data, and said host computer comprises a monitor screen for displaying the screen data, said host computer simultaneously directing the screen data to the monitor screen and to said intermediate server through the network in response to a command entered by a host computer user.

14. The apparatus according to claim 11 wherein said conversion program directs said intermediate server to send the translated host data to said receiver computer in a synchronous mode.

15. A method for sharing data between a host computer and a receiver computer through a network, the method comprising:

sending a request from the host computer to an intermediate server over the network, the host computer including host data, said host data comprises screen data representing data displayed to a user on a monitor screen connected to the host computer;

sending, in response to the request from the host computer, a session confirmation output from the intermediate server to the host computer and establishing a communication session over the network between the host computer and the intermediate server;

sending the host data from the host computer to the intermediate server;

directing the intermediate serve to translate the host data from the host computer into translated data;

interfacing a receiver computer with the network; and sending the translated host data to the receiver computer, wherein the network comprises the Internet and said method further comprises:
interfacing the host computer with the intermediate server through the Internet;
interfacing the intermediate server with the receiver computer using the World Wide Web Protocol; and
translating the host data with the intermediate server to HTML data.

16. The method according to claim 15 further comprising:

interfacing a content server with the network, the content server having content data;

interrelating the translated host data and the content data.

17. The method according to claim 15, further comprising:

simultaneously directing the screen data to both the monitor screen of the host computer and to the intermediate server through the network in response to a command entered by the host computer user; and displaying the screen data on the monitor screen of the host computer while displaying the translated host data from the intermediate server on a monitor screen connected to the receiver computer.

18. An apparatus for sharing data through a network between a receiver computer and a host computer including host data, the apparatus comprising:

an intermediate server interfaced with the network, the intermediate server comprising an application program interface that establishes a communication session with the host computer in response to a set-up request received from the host computer; and a conversion program for operationally controlling the intermediate server to:
receive the host data from the host computer through the network,
translate the host data, and
send the translated host data to the receiver computer,
wherein the host data comprises screen data representing data displayed to a user on a monitor screen connected to the host computer, and further wherein the conversion program controls the intermediate server to translate the screen data to an HTML format.

19. The apparatus of claim 18, further comprising a local storage device operationally coupled to the intermediate server, and wherein the translation program controls the intermediate server to store the translated host data on the local storage device.

20. The apparatus of claim 19, further comprising a playback program for controlling the intermediate server to:

retrieve translated host data stored on the local storage device, and send the retrieved translated host data to the receiver computer.

21. The apparatus of claim 18 wherein the intermediate server is interfaced with the Internet.

22. The apparatus of claim 21 wherein the conversion program controls the intermediate server to:

search the screen data to identify a code, and translate the code to a phrase related to the data.

23. An apparatus for sharing data between a host computer and a receiver computer through a network, the apparatus comprising:

a host computer interfaced with the network, the host computer including host data, wherein the host data comprises screen data;

a receiver computer interfaced with the network;

an intermediate server interfaced with the network, said intermediate server comprising a session application program interface that establishes a communication session with said host computer in response to a set-up request received from said host computer; and a conversion program loaded on said intermediate server, said conversion program operationally directing said intermediate server to:
receive the host data from said host computer through the network after the communication session has been established between said host computer and said
intermediate server;
translate the screen data to an HTML format; and
send the translated host data to said receiver computer, wherein the screen data is displayed on a monitor screen connected to the host computer while simultaneously the translated screen data from the intermediate server is displayed on a monitor screen connected to the receiver computer.

24. A method for sharing data between a host computer and a receiver computer through a network, the method comprising:

sending a request from the host computer to an intermediate server over the network, the host computer including host data, said host data comprises screen data representing data displayed to a user on a monitor screen connected to the host computer;

sending, in response to the request from the host computer, a session confirmation output from the intermediate server to the host computer and establishing a communication session over the network between the host computer and the intermediate server;

sending the host data from the host computer to the intermediate server;

directing the intermediate server to translate the screen data from the host computer into translated screen data;

interfacing a receiver computer with the network; and sending the translated screen data to the receiver computer, wherein the network comprises the Internet and said method further comprises:

interfacing the host computer with the intermediate server through the Internet;

interfacing the intermediate server with the receiver computer using the World Wide Web Protocol; and displaying the screen data on the monitor screen connected to the host computer while simultaneously displaying the translated screen data from the intermediate server on a monitor screen connected to the receiver computer.

* * * * *

UNITED STATES PATENT AND TRADEMARK OFFICE
CERTIFICATE OF CORRECTION

PATENT NO. : 6,199,104 B1            Page 1 of 1
DATED : March 6, 2001
INVENTOR(S) : Daniel C. Delph It is certified that error appears in the above-identified patent and that said Letters Patent is hereby corrected as shown below:

Column 9, claim 15,
Line 45, "intermediate serve" should read -- intermediate server --.

Signed and Sealed this

Eighteenth Day of December, 2001

Attest:

JAMES E. ROGAN
*Attesting Officer*      *Director of the United States Patent and Trademark Office*